United States Patent [19]
Kilman et al.

[11] Patent Number: 5,479,799
[45] Date of Patent: Jan. 2, 1996

[54] KEY AND BOLT LOCK DEVICE

[75] Inventors: John Kilman, deceased, late of Atlanta, Ga., by Mary Helen Kilman, co-executor; Kent C. Falkenstein, Orangevale, Calif.; Donal O. Beckstead, Folsom, Calif.; Phillip L. Myers, Lithonia, Ga.

[73] Assignee: Kilman Electriloc Company, Stone Mtn, Ga.

[21] Appl. No.: 329,976

[22] Filed: Oct. 27, 1994

[51] Int. Cl.⁶ ..................................... F16B 41/00
[52] U.S. Cl. ................ 70/231; 70/165; 70/189; 70/232; 70/278; 411/402; 411/910
[58] Field of Search ............... 70/188, 189, DIG. 57, 70/165, 218, 221–223, 229–232, 277, 278; 411/402, 910, 911, 919

[56] References Cited

U.S. PATENT DOCUMENTS

| | | | |
|---|---|---|---|
| 2,090,302 | 8/1937 | Montgomery et al. | 70/165 |
| 3,584,484 | 6/1971 | Hallmann et al. | 70/276 |
| 3,748,878 | 7/1973 | Balzano et al. | 70/277 X |
| 4,161,870 | 7/1979 | Barnes | 70/278 |
| 4,250,533 | 2/1981 | Nelson | 361/172 |
| 4,286,305 | 8/1981 | Pilat et al. | 361/172 |
| 4,620,428 | 11/1986 | Kopesky | 411/910 X |
| 4,791,280 | 12/1988 | O'Connell et al. | 235/382.5 |
| 4,956,984 | 9/1990 | Chi-Cheng | 70/277 |
| 5,117,097 | 5/1992 | Kimura et al. | 235/439 |
| 5,140,317 | 8/1992 | Hyatt, Jr. et al. | 340/825.31 |

FOREIGN PATENT DOCUMENTS

| | | | |
|---|---|---|---|
| 34344 | 5/1929 | France | 70/231 |
| 355578 | 6/1922 | Germany | 70/218 |

*Primary Examiner*—Lloyd A. Gall
*Attorney, Agent, or Firm*—Jones & Askew

[57] ABSTRACT

The present invention provides for a key and bolt lock device. The key is constructed in a housing shell to be received by the head of the bolt. The key includes a power source, typically a battery, and a transmit coil which is capable of transmitting both energy and data from the key to a receiving coil in the bolt. This energy and data transfer is usually conducted by magnetic coupling. The key also includes a memory device for storing security codes which are used to compare to security codes stored in the bolt as well as a device for retrieving and transmitting the security code, typically an 8-bit microcontroller. The bolt has a body which is operatively associated with a head of the bolt so that the head rotates on the body when the bolt is in a locked position. The bolt also includes a latching device which is capable of attaching the head of the bolt to the body of the bolt so that the head and body may be rotated together. The bolt also contains a receiving coil capable of receiving energy and data from the transmitting coil of the key through magnetic coupling. The bolt contains a memory device for storing security codes and energy storage device. The bolt is operated by a microcontroller.

5 Claims, 4 Drawing Sheets

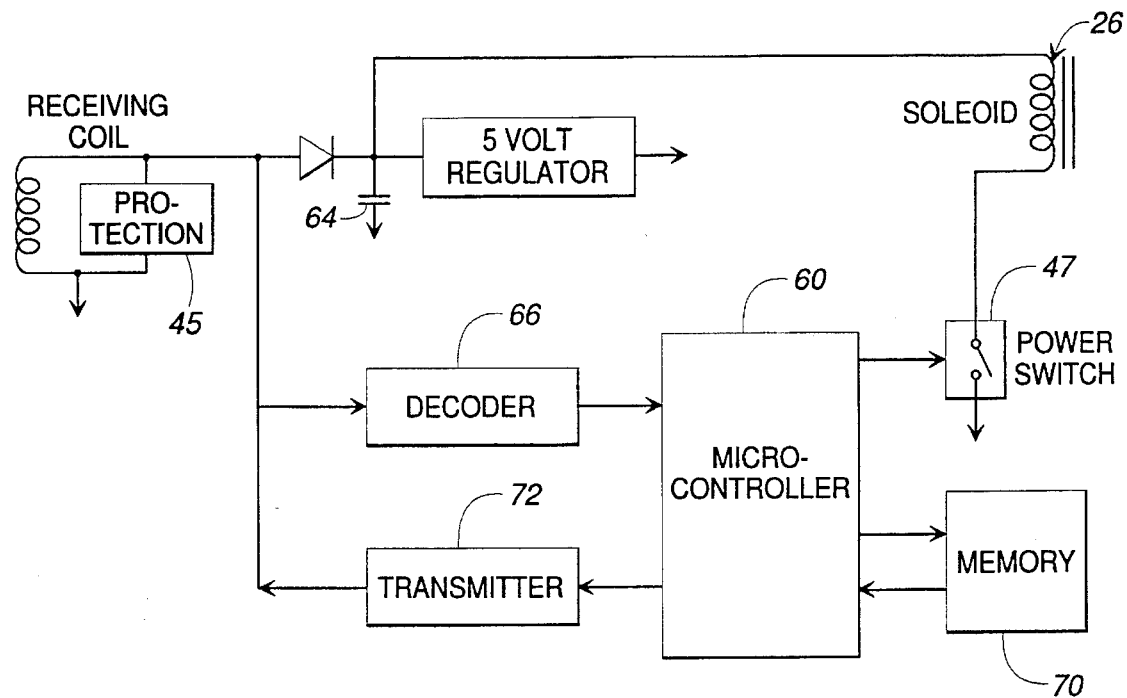
FIG. 4
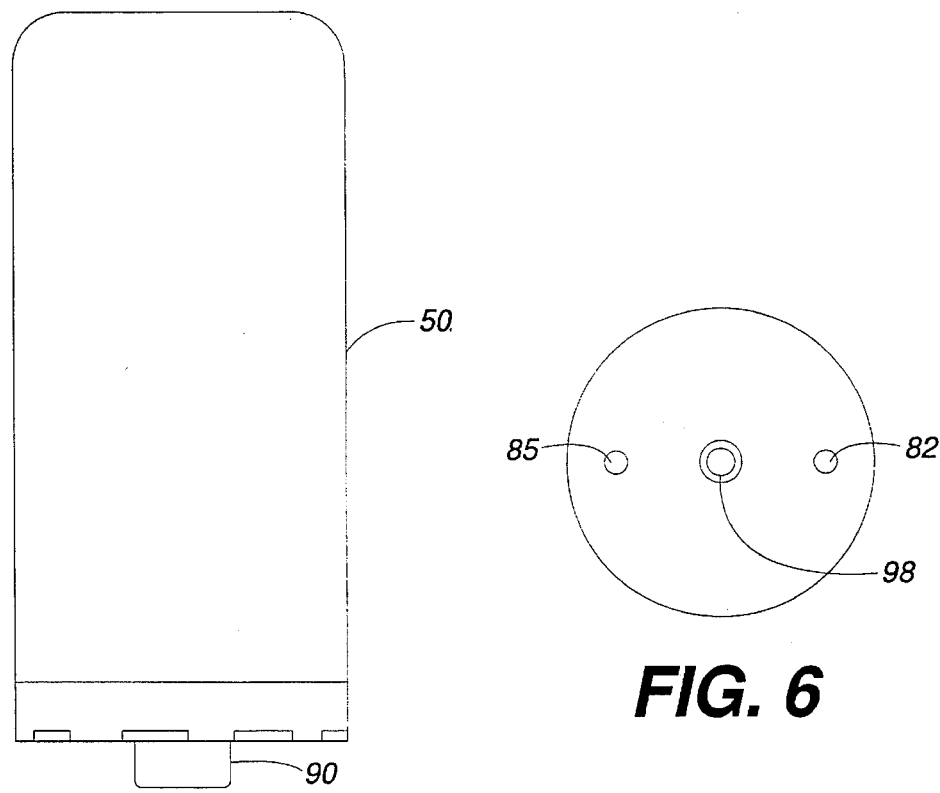
FIG. 5
FIG. 6

| 74 | 76 | 78 | 79 |
|---|---|---|---|
| 9 DIGIT CUSTOMER CODE | 5 DIGIT KEY NUMBER | 2 DIGIT LOST CODE | 5 DIGIT PROGRAMMER ID |
| 000000000 | 00000 | 00 | 00000 |

KEY AND BOLT LOCK DEVICE

TECHNICAL FIELD

The present invention relates to locking devices, and more particularly relates to a programmable key and bolt lock device used to protect and secure items with a bolt device while providing access to remove the bolt with an authorized or corresponding key device for access to the protected area.

BACKGROUND OF THE INVENTION

There are a variety of security systems which use electronically encoded devices in operation. These systems generally use some type of an identification or security code which is stored in a locking device to be unlocked with a key which contains a corresponding identification or security code. These types of devices, such as those disclosed in U.S. Pat. Nos. 5,140,317 (the "'317 patent") issued to Hyatt Jr., et al. and 4,250,533 (the "'533 patent") issued to Nelson, provide for transfer and comparison of identification codes between the key and lock or bolt device. If the codes being compared are identical, then the security device changes states from locked to unlocked or vice versa. For these types of security devices, there are various ways that power and/or data can be transferred between a lock and key, such as by using a light emitting diode (LED) and photosensor or by using traditional contacts between the lock and key device. With the use of contacts to transmit power and data, there is a potential that the contact points will become damaged or worn such that operation of the device becomes difficult or impossible. In devices that use an LED and photosensor to transfer data, an additional power source is typically needed, as disclosed in the '317 patent, and there is a potential for erroneous data transfer if the photosensor or LED become mis-aligned or damaged.

There are also other problems that have been experienced with prior lock and key devices which use electronically encoded identification codes to operate. For instance, some electronically encoded lock and key devices do not have a self-contained power supply. This creates the need for an additional item (i.e., a separate power supply) to operate the system. Furthermore, many of these lock and key systems have only "one-way" communication between the key and lock. Therefore, there are several desirable features which are not available in some prior security lock and key systems. Another problem presented in the art can be the difficulty in reprogramming a particular lock if the corresponding key is lost or misplaced. Some prior art devices, such as that disclosed in the '533 patent, use a programmable read-only memory (PROM) device to store the security or identification code in the lock device. These systems typically require removing the PROM device from the lock in order to reprogram it when a key has been lost or misplaced. This requirement introduces inefficiencies into the process of reprogramming a lock and also provides the potential for damage to the PROM device and the key or lock from which it is removed.

Thus, there is a need in the art for an electronically encoded lock and key device which can provide power and transmit data through the same medium without requiring a light source with a photosensor or other optical connections and without requiring the use of direct contacts, and which has a self-contained power source and provides for two-way communication between the lock and key devices.

SUMMARY OF THE INVENTION

The present invention solves the problems of the prior art described above. The present invention is a key and bolt lock device which is small in size and can be used to lock and protect almost any item or area which a user desires.

Briefly described, the apparatus includes a key to be received by a bolt device. The key includes a housing shaped to be received by the head of the bolt. The key also includes a power source and a transmitting coil such that the transmitting coil can transfer energy and data from the power source to a receiving coil located in the bolt by magnetic coupling. The key also contains a memory device capable of storing at least one security code which can be accessed and transferred to the bolt. The bolt includes a head capable of receiving the key and a body which is operatively associated with the head such that the head rotates on the body when the bolt is in a locked position. The body of the bolt is preferably threaded. The bolt also includes latching means which, when activated, attach the head of the bolt to the body of the bolt so that the head and body can rotate together when force is applied to the head. The bolt also includes a receiving coil capable of magnetically coupling with the transmit coil in the key. The receiving coil is used to receive energy for operation of the bolt as well as to receive data from the key to be used in the operation of the bolt. The bolt contains a second memory device which is capable of storing at least one security code and an energy storage means for storing energy received from the key to operate the bolt. A microcontroller which receives the security code transmitted from the key and retrieves the security code stored in the second memory device is also provided. The microcontroller controls the activation of the latching means in the bolt.

The latching means in the bolt is operated with the use of a solenoid. The solenoid includes a pole piece and a coil spring which urge a locking pin upwards during the period when the solenoid is not activated and the bolt is in a locked position. When the solenoid is activated, the coil spring and pole piece permit the locking pin to move downward in the bolt. A torsion spring is also provided which urges the locking pin downward. A latching pin is also secured to the pole piece so that when the solenoid is activated, the latching pin is urged downward with the locking pin and provides a connection between the bolt head and body such that rotation of the entire bolt can be accomplished.

Still more particularly described, the energy storage means is typically a capacitor which is preferably 470 microfarads. The power source is preferably a battery which is located inside of the key. There is also means provided to activate the power source in the key.

Accordingly, it is an object of the present invention to provide a key and bolt lock device which provides for the transfer of both energy and data through magnetic coupling between the key and bolt.

It is another object of the present invention to provide a key and bolt lock device which does not require the use of an LED and photosensor or direct galvanic contacts to transfer energy or data between the key and bolt.

It is another object of the invention to provide a key and bolt lock device which permits two-way transfer of data between the key and bolt.

It is another object of the present invention to provide a key and bolt lock device which provides access to a locked area only upon application of a programmed key to a corresponding programmed bolt head.

It is another object of the present invention to provide a programmable locking device so that access or identification codes stored in the key and/or bolt can be changed as desired.

It is another object of the present invention to provide a key and bolt lock device where there is no power supply required in the bolt.

It is another object of the present invention to provide a key and bolt lock device with a key small enough in size to easily transport it.

It is another object of the present invention to provide a locking device which will not have to be reprogrammed if a key is lost or misplaced.

Other features, objects and advantages of the present invention will become apparent upon reading the following specification when taken in conjunction with the drawings and the appended claims.

BRIEF DESCRIPTION OF THE DRAWINGS

FIG. 4 is a block diagram of the electronics contained in the preferred bolt.

FIG. 5 is a side cross-sectional view of the preferred key.

FIG. 6 is a top view of the preferred key.

DETAILED DESCRIPTION OF THE PREFERRED EMBODIMENT

Figure 1:
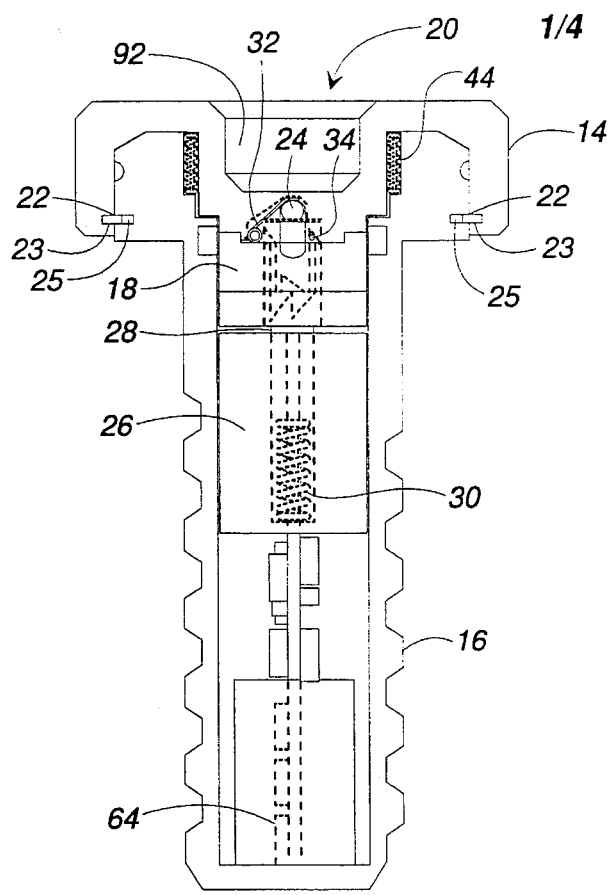
FIG. 1 is a side cross-sectional view of the preferred bolt.

Referring now to the drawings, in which like numerals refer to like parts throughout the several views, FIG. 1 is a side cross-sectional view of a bolt 20 according to the present invention. The bolt 20 contains a head 14 and a body 16 that are operatively associated by an electromechanical locking mechanism 18 which acts to engage and disengage the head 14 to the body 16. When the locking mechanism 18 is engaged, the head 14 and the body 16 become engaged to allow the entire bolt 20 to be rotated. When the locking mechanism 18 is disengaged, rotational force applied to the head 14 is not transferred to the body 16 and, therefore, the bolt 20 cannot be turned. When the bolt 20 is in a disengaged position, the head 14 can be rotated about the body 16 without any movement of the body. However, even in the disengaged position, the head 14 is still attached to the bolt 20 and cannot be removed from the bolt. Although the attachment points 22 between the head 14 and bolt 16 can be established by a variety of means, the preferred way that the head and bolt remain attached is shown in FIG. 1. Essentially, the head and body are attached at points 22 by use of a planar disc 23 being placed in slit 25 in the head and body. The planar disc 23 allows the head 14 to rotate about the body 16 without becoming dis-attached from the body 16.

Figure 2:
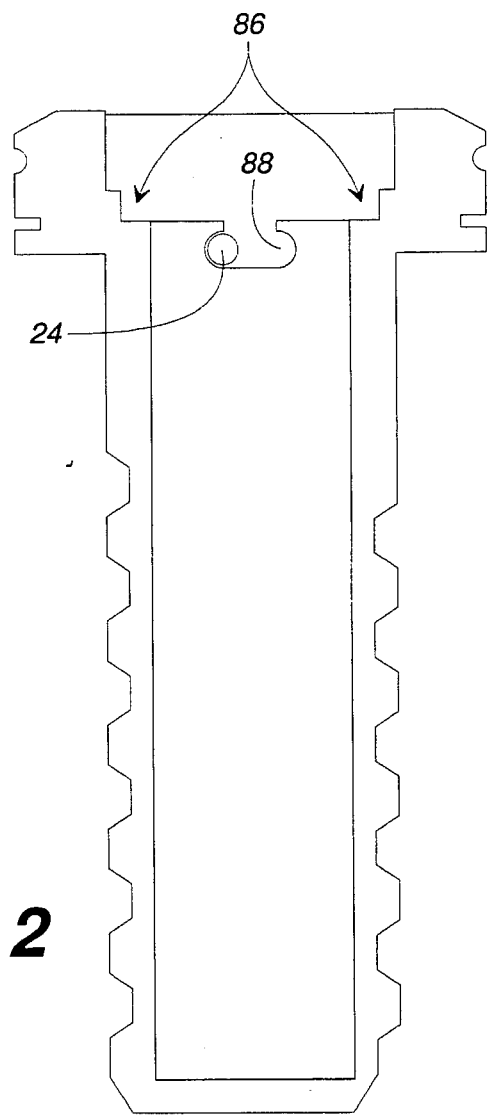
FIG. 2 is a side cross-sectional view of the shell of the preferred bolt.

The locking mechanism 18 provides means for latching the head 14 and body 16 so that the bolt 20 can rotate. The locking mechanism is contained in the bolt 20 and is operated by the interaction of a number of elements. The position of a locking pin 24 determines whether the bolt 20 is in a locked or unlocked position. In the locked position, the head 14 is free to rotate about the body 16 without any rotational force being placed on the body. When the bolt is in an unlocked position, the body is engaged to the head and the entire bolt 20 will rotate upon the appropriate application of rotational force to the head 14. The outer shell of the body 16 is threaded so that the bolt may be "unscrewed" when in an unlocked position. If the locking pin 24 is at a high position, it will be located at some point on the ledge 86, as shown in FIG. 2. When the locking pin 24 is on the ledge 86, the bolt 20 is in a locked position and the head 14 can be rotated without corresponding rotation of the body 16. On the other hand, if the locking pin 24 is in a position located in the well 88 below ledge 86, as shown in FIG. 2, the bolt 20 is in an unlocked position and the head 14 and body 16 are engaged so that the entire bolt 20 may be rotated upon application of the appropriate rotational force to the head. The position of the locking pin is controlled by a solenoid 26 which includes a pole piece 28 and a coil spring 30 as shown in FIG. 1.

When the solenoid 26 is energized, the pole piece 28 and coil spring 30 are retracted which causes the locking pin 24 to fall downward. A torsion spring 32 is also preferably located above the locking pin 24 to urge the pin downward towards the well 88. The strength of the torsion spring 32 is less than that of the coil spring 30 in the solenoid 26 so that the locking pin 24 will not descend into the well 88 without energization of the solenoid 26. Therefore, when the solenoid 26 is in an unenergized state, the coil spring 30 provides sufficient upward force to keep the locking pin 24 from falling downward so that the locking pin rests on the ledge 86.

Figure 3A:
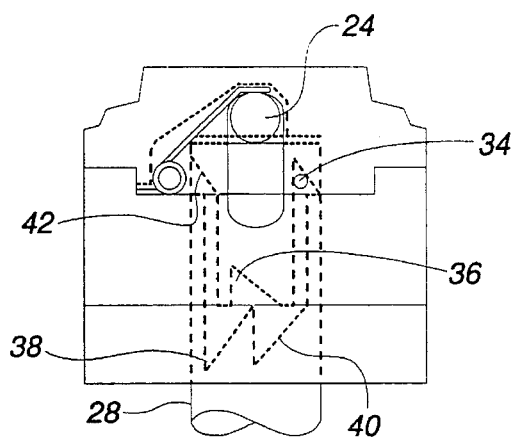
FIGS. 3A–3E are side cross-sectional views of the head of the preferred bolt which show movement of the locking pin and latching pin.
Figure 3B:
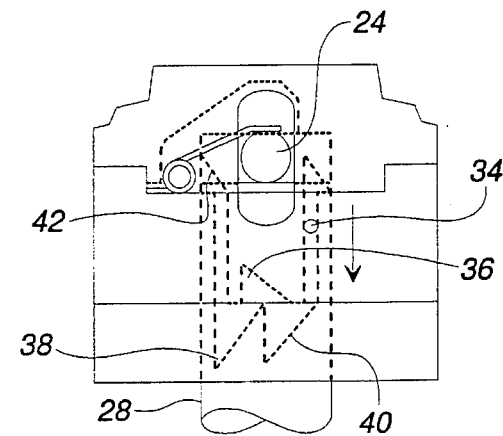
Figure 3C:
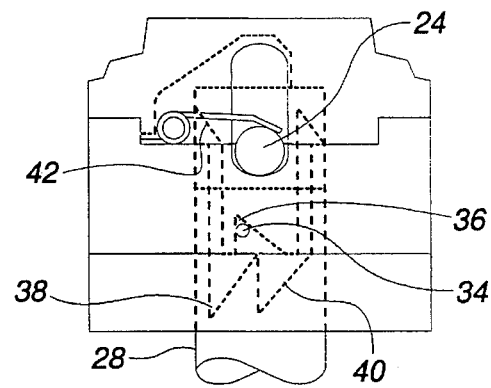

A latching pin 34 is also provided with the electromechanical locking mechanism 18. The movement of the latching pin corresponds to movement of the pole piece 28 and coil spring 30. The latching pin 34 travels upward and downward with the pole piece and coil spring. FIGS. 3A–3E show the movement of the locking pin 24 and the latching pin 34 during different stages of the energization of the solenoid 26. Initially, both the latching pin 34 and the locking pin 24 are at the top of their respective travel positions as shown in FIG. 3A. In FIG. 3A, the pole piece 28 is at its highest position and is supported by the coil spring 30. When the solenoid 26 is energized, the latching pin 34 descends with the pole piece 28 as shown in FIG. 3B, and eventually is held down against a rest 36 such as shown in FIG. 3C. The latching pin 34 being pressed against the rest 36 holds the solenoid 26 down and the bolt 20 in an unlocked position until the key 50 is again used to place the bolt 20 in a locked position. When the latching pin 34 is initially pressed against a rest 36, the head 14 of the bolt 20 can be rotated until it contacts the body 16; thereafter, permitting the head 14 and the body 16 to rotate together. During the time that the locking pin 24 and the latching pin 34 are in the lower positions, as shown in FIG. 3C, the solenoid 26 is unenergized.

Figure 3D:
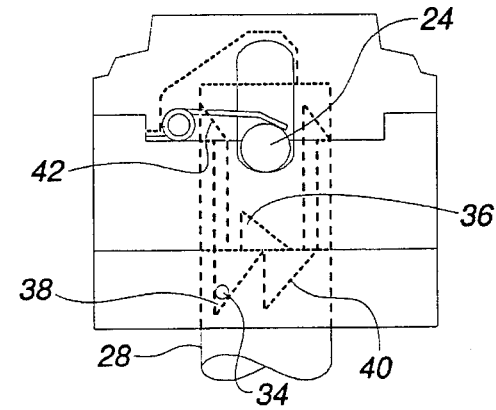
Figure 3E:
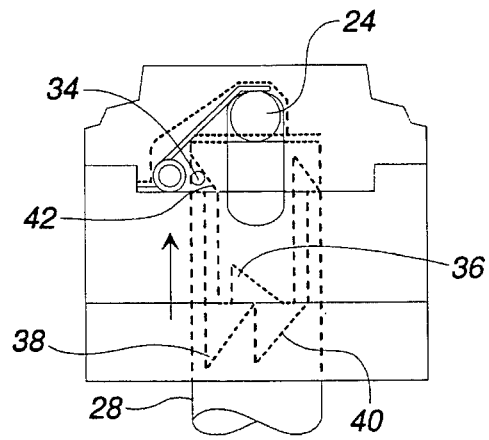

When the bolt 20 is in an unlocked position, as shown in FIG. 3C, the key 50 would be used to place the bolt 20 in the locked position. Therefore, when the latching pin 34 is being pressed against a rest 36 and the solenoid 26 is again energized, the latching pin 34 is pulled down hitting the bottom ramp 38 on piece 40 located above the pole piece 28. When the latching pin 34 contacts the bottom ramp 38, the pole piece 28 and latching pin 34 are caused to rotate slightly, approximately 15 degrees, in the clockwise direction so that the latching pin clears the indention of the rest 36 as shown in FIG. 3D. When power to the solenoid 26 is then removed, the pole piece 28 rises, driving the latching pin 34 toward the top ramp 42 and places the bolt 20 in a locked position. The locked position is shown in FIG. 3E and again permits the head 14 to rotate freely about the body 16.

As discussed above, FIG. 3 shows the actions in the head 14 during the period where the bolt 20 goes from being in a locked position to an unlocked position and back to a locked position. It can also be noticed that the latching pin 34 is positioned on different sides of the bolt 20 when comparing FIGS. 3A and 3E. If the process as shown in FIGS. 3A–3E were repeated, the latching pin 34 would continue to rotate in the clockwise direction until it would return to the position as shown in FIG. 3 A.

Figures 7, 8:
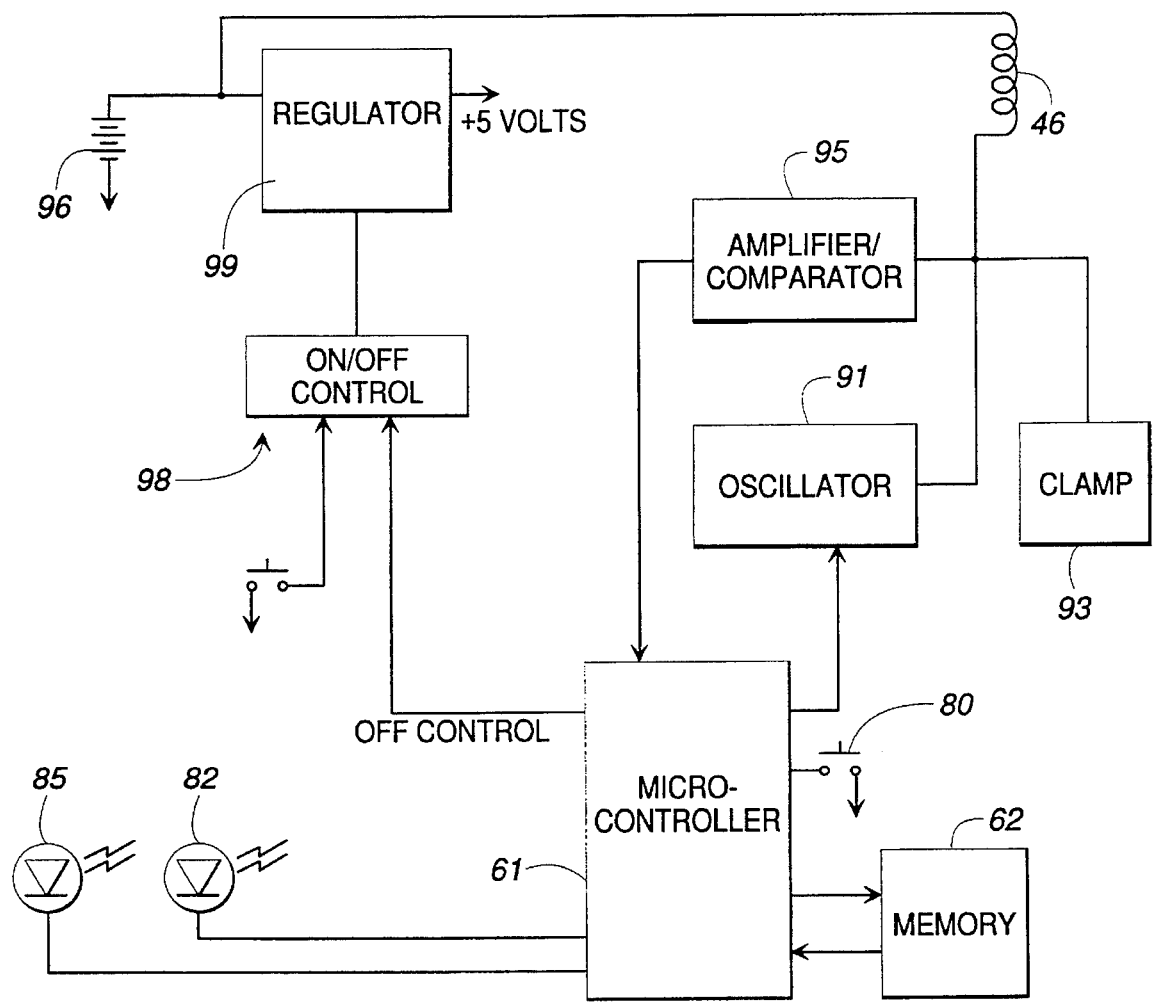
FIG. 7 is a block diagram of the electronics contained in the preferred key.
FIG. 8 is a diagram showing a sample identification code.

FIG. 4 shows a block diagram of the electronics contained in the bolt 20. The receiving coil 44, which is provided with a surge protector 45, in the bolt 20 is aligned with the transmitting coil 46 of the key 50, as shown in FIG. 7, to allow for inductive (magnetic) coupling between the transmitting coil 46 and the receiving coil 44. In operation, the key 50 is placed into the top portion of the head 14 of the bolt 20 in order to begin inductive coupling. When the voltage rises above five volts across a capacitor 64, the eight-bit microcontroller 60 in the bolt 20 begins to await an identification code and other commands which are serially transmitted from a memory chip 62 in the key 50. When the voltage across the capacitor 64 rises to approximately twenty volts, which typically takes approximately one to two seconds, the key 50 will begin to modulate the drive to the transmitting coil 46 to transmit bits of data to the bolt 20 from the key 50. The capacitor 64 is preferably 470 microfarads. The data is then preferably transferred in ten-bit packets with bits one and ten serving as start and stop bits. The data is processed in a decoder 66 and sent for temporary storage to the microcontroller 60. During this process, the transmitting coil 46 and the receiving coil 44 are used both as a power supply and to transmit data from the key 50 to the bolt 20. It is also possible to transmit data from the bolt 20 to the key 50. In that circumstance, the roles of the transmitting coil 46 and the receiving coil 44 would be reversed. Each data byte (the eight bits between the start and stop bit) is stored in the microcontroller 60 until all the data is sent from the key 50 to the bolt 20. The bytes of data from the key 50 represent the identification code which will be compared to the identification code stored in the bolt 20.

The microcontroller 60 then reads the identification code which is stored in the bolt's memory device 70, preferably a non-volatile memory chip such as an EEPROM chip. The microcontroller 60 compares the identification code stored in the key 50 with the code from the bolt 20 and, if the codes are the same, the microcontroller 60 will initiate a function which was requested by the key 50. The typical function which the key 50 will initiate will be to energize the solenoid 26, through a power switch 47 in the bolt 20, and, therefore, to change the bolt 20 from the locked to the unlocked position or vice versa. However, the key 50 may also be used to reprogram the security code of the bolt to a new value, or to read the identification code of the bolt. If the key 50 is being used to read the identification code of the bolt 20, the roles of the key 50 and bolt 20 are essentially reversed. The two coils switch roles in this capacity and the receiving coil 44 transmits the data to the transmitting coil 46. The microcontroller 60 reads the bolt's identification code from the memory chip 70 in the bolt 20 and then transmits this code serially through a transmitter 72 and to the key 50 using the inductive coupling between the receiving coil 44 and the transmitting coil 46. During the data transfer process, the circuit as shown in FIG. 4 is powered by the energy stored in the 470 microfarad capacitor 64. The capacitor 64 also provides the energy to activate the solenoid 26, if necessary.

The basic housing design of the key 50 is shown in FIG. 5, which is a cross-section of the key. The shape is essentially cylindrical with a smaller cylindrically shaped protrusion 90 extending from the end of the key 50. The smaller cylindrically shaped protrusion 90 is placed into the indention 92 in the head of the bolt 20 during operation. This aligns the transmitting coil 46 in the key 50, as shown in FIG. 7, with the receiving coil 44 in the bolt 20, as shown in FIG. 1, to permit for inductive coupling between the two coils. The key 50 also contains a memory device 94 in order to store various data items related to the operation of the key 50. This memory device 62 is typically a EEPROM device. Although the identification code can be any finite set of numbers, the memory device 62 of the key 50 preferably stores at least one 21 bit identification code which, in connection with a corresponding bolt, can operate (lock and unlock) the bolt 20. The key 50 is also equipped with a power source 96, which is preferably a "AA" cell battery. The power source 96 provides power, through inductive coupling, to operate both the key 50 and bolt 20. The key 50 is also provided with two different light emitting diodes (LEDs) 82 and 85 as shown in FIG. 6. The LEDs 82 and 85 are used to indicate various operational states of the key 50. A switch 98 on the key 50, as shown in FIG. 6, connects to the power source and determines whether the key 50 is in normal mode operation or in program mode operation.

FIG. 7 shows a block diagram of the electronics contained in the key 50. In operation, the key 50 is inserted into the bolt 20 and the power on switch 98 is pressed applying five volt power, by regulator 99, to the microcontroller 61. Thereafter, the microcontroller 61 enables an oscillator/driver 91, to drive the transmitting coil at approximately 25 Khz. A clamp circuit 93 is also provided to clamp any spikes generated by the transmitting coil 46. The energy from the transmitting coil 46 is coupled into the receiving coil 44 in the bolt. The bolt converts the 25 Khz signal to direct current and begins to charge up the capacitor 64. Also at this time, the key microcontroller 61 retrieves the security code from a memory device 62, preferably an EEPROM device. After approximately one second, the key 50 begins sending the security information to the bolt 20 by modulating the 25 Khz signal. This transfer is accomplished by turning the 25 Khz signal on and off at about a one millisecond rate with each on and off period constituting a bit. The data is sent in packets of 10 bits with the first and last bits being the start and stop bits respectively. The eight bits of data between the start and stop bits represent one character of data in the security code. Each byte of data transferred is stored by the bolt 20 until the key 50 is finished sending all of the data.

After transferring the data, the key 50 then waits for the bolt 20 to respond. The bolt decodes the security data and compares it against its own security code which is stored in its internal memory device 70, preferably a EEPROM device. With the charge remaining on the capacitor 64, the bolt signals the key whether the security codes are a match. Typically, the signal from the bolt is weak and is amplified by the amplifier/comparator circuit 95 in the key 50. If there is a match of the security codes, the key 50 turns the oscillator/driver 91 on for a short interval at which time the bolt activates the internal solenoid 26 unlocking the bolt. The success or failure of the operation is indicated by the LED status light 82 on the key The process for locking the bolt is essentially the same as described for unlocking the bolt.

The program mode of the key 50 is used to set the identification code of the bolt 20 to that of the key 50. The LEDs 82 and 85 are used to indicate the state of the battery, whether the key 50 is in the program mode and whether the key in use can operate the particular bolt it is being pushed into.

Although there are many variations and ways to establish an identification code system for the bolt 20 and key 50, the preferred identification code structure is shown in FIG. 8. Initially, each key and bolt preferably have a blank or zeroed 21-digit identification code. The initial nine digits 74 shown in the code represent a customer identification number. Each key and bolt owner would have its own customer unique identification number. This nine-digit number 74 would be the same for each bolt and key owned by a particular person or company. The next five digits in the identification code 76 represent a "key number" which will be supplied by the user or owner of the bolt and key device. This five-digit number 76 identifies to the user which bolts that a particular key will open. The next two digits of the 21-digit identification code are used as a "lost key code" 78. The initial key for a bolt will have zero as the lost key code. This number is incremented each time the key is lost and must be replaced by a new one. By using the lost key code 78, the bolt owner can prevent a key from being used on a bolt once it has been discovered as missing or lost. This lost key code 78 can be incremented to prevent lost keys from later being used to unlock the bolt 20. The final five digits in the 21-digit identification code is a programmer identification code 79. This five-digit number identifies the programmer which sets the complete identification code for a particular key.

Thereafter, prior to the time that a key is placed into use, the nine-digit customer identification number and the five-digit key code are programmed into the key using one of several programming devices which are known in the art. Any compatible bolt, as described above, may then be programmed to be activated (locked or unlocked) by a particular key. To program a bolt to be used with a particular key, the user switches the battery component of the key 50 to the "PROGRAM" mode as shown by switch 80 in FIG. 7. The program switch 80 can be activated by many ways which are known in the art, such as by keeping the on/off control 98 in a manually depressed state. The key is then placed into the bolt 20 similar to the process for locking or unlocking the bolt. The LED 82 will light when the key 50 has been placed into the bolt 20 to indicate that the programming is in process. Any key 50 may be utilized to program any "blank" or previously unprogrammed bolts.

The bolt 20 and key 50 can be used in connection with any device which a user desires to keep locked and secured. One primary use for the bolt 20 and key 50 device is in connection with well caps, such as those used in service stations to cover and protect gasoline storage tanks. When used with storage tanks, the bolt 20 is typically exposed to the outside elements. Therefore, it is desirable to keep the power source 96 for the locking device in the key 50, as discussed above. Also, with this particular use for the bolt 20 and key 50, it is an advantage that there are no contacts needed which could corrode or be otherwise effected by being exposed to the outdoor environment.

It will thus be seen that a key and bolt security device has been described with many advantages over other locking security devices. While this invention has been described in detail with particular references to the preferred embodiments thereof, it will be understood that variations and modifications can be effected within the spirit and scope of the invention as described herein before and as defined in the appended claims.

We claim:

1. A key and bolt lock device, comprising: a key to be received by a bolt, device, said key including:

a housing such that said key can be received by said bolt;

a power source;

a transmit coil such that said transmit coil can transfer energy and data to a receiving coil located in said bolt by magnetic coupling; and a memory device capable of storing at least one security code;

means for transmitting a security code from said memory device to said bolt; and said bolt, including:

a head capable of receiving said key;

a body which is operatively associated with said head such that said head rotates on said body when said key and bolt lock device is in a locked position;

latching means which, when activated, attach said head to said body so that said head and body rotate together;

a receiving coil capable of magnetically coupling with said transmit coil in said key, receiving energy for operation of bolt functions, and receiving data from said transmit coil;

a second memory device capable of storing a security code;

energy storage means for storing energy received from said key in order to operate said bolt; and a microcontroller which receives the security code transmitted from said key by said transmit coil, and retrieves said security code stored in said second memory device, compares said key security code to said second security code, and if the two codes are the same, activates said latching means.

2. The key and bolt lock device of claim 1 in which said latching means comprise:

a locking pin;

a solenoid including a pole piece on the top of said solenoid urging said locking pin upward and a coil spring below said pole piece urging said pole piece upward so that when said solenoid is activated, said coil spring permits said locking pin to move downward in said bolt;

a torsion spring which urges said locking pin downward; and a latching pin which is secured to said pole piece which contacts said bolt body when said solenoid is activated so that said bolt head can rotate with said bolt body.

3. The key and bolt lock device of claim 1 in which said energy storage means is a capacitor.

4. The key and bolt lock device of claim 1 in which said power source is a battery.

5. The key and bolt lock device of claim 1, further comprising:

programming means in said key in which said key can initially provide a security code to said bolt which is stored by said bolt in said second memory device and used as said second security code.

\* \* \* \* \*